United States Patent [19]
Stelzmüller et al.

[11] Patent Number: 5,731,065
[45] Date of Patent: Mar. 24, 1998

[54] MULTILAYERED, TEXTILE, GAS-PERMEABLE FILTER MATERIAL AGAINST TOXIC CHEMICAL SUBSTANCES

[75] Inventors: Helmut Stelzmüller, Neuhausen/Fildern; Hans-Joachim Töpfer, Backnang; Gerhard Stäbler, Herrenberg; Thomas Stoll, Metzingen, all of Germany

[73] Assignee: Alfred Karcher GmbH & Co., Winnenden, Germany

[21] Appl. No.: 367,117

[22] PCT Filed: Jul. 7, 1993

[86] PCT No.: PCT/EP93/01759

§ 371 Date: Jan. 6, 1995

§ 102(e) Date: Jan. 6, 1995

[87] PCT Pub. No.: WO94/01198

PCT Pub. Date: Jan. 20, 1994

[30] Foreign Application Priority Data

Jul. 7, 1992 [DE] Germany .................... 42 22 295.8
Mar. 27, 1993 [DE] Germany .................... 43 10 110.0

[51] Int. Cl.$^6$ ................... B32B 27/14; B32B 7/12
[52] U.S. Cl. .................. 428/198; 428/299.1; 428/367; 428/408; 428/354
[58] Field of Search ....................... 428/247, 252, 428/198, 299, 311.5, 359, 367, 408, 354

[56] References Cited

U.S. PATENT DOCUMENTS

| | | | |
|---|---|---|---|
| 4,455,187 | 6/1984 | von Blücher et al. | 156/277 |
| 4,457,345 | 7/1984 | von Blücher et al. | 139/420 R |
| 4,513,047 | 4/1985 | Leach et al. | 428/252 X |
| 4,520,623 | 6/1985 | Ogawa et al. | 57/236 |
| 4,726,978 | 2/1988 | Simpson | 428/408 X |
| 4,869,947 | 9/1989 | Kirayoglu | |
| 4,904,343 | 2/1990 | Giglia et al. | 428/316.6 X |
| 5,190,806 | 3/1993 | Nomi | 428/317.1 X |

FOREIGN PATENT DOCUMENTS

| | | |
|---|---|---|
| 0 079 488 | 5/1983 | European Pat. Off. . |
| 230097 | 7/1987 | European Pat. Off. . |
| 28 43 974 | 4/1980 | Germany . |
| 29 51 827 | 7/1981 | Germany . |
| 83 01 282 | 2/1984 | Germany . |
| 38 17 084 | 9/1989 | Germany . |
| 38 26 089 | 2/1990 | Germany . |
| 92 04 832 | 7/1992 | Germany . |
| 1 245 965 | 9/1971 | United Kingdom . |
| 1 301 101 | 12/1972 | United Kingdom . |
| 1 310 011 | 3/1973 | United Kingdom . |
| 2 096 536 | 10/1982 | United Kingdom . |

OTHER PUBLICATIONS

Japanese Application No. 1-221557, Patent Abstracts of Japan C-660, Nov. 29, 1989, vol. 13, No. 536.

*Primary Examiner*—Daniel Zirker
*Attorney, Agent, or Firm*—Barry R. Lipsitz; Ralph F. Hoppin

[57] ABSTRACT

In order to improve the handling and filtering characteristics of a multilayered, textile, gas-permeable filter material against toxic chemical substances and, in particular, filter and protective materials for the production of sheet-like filters and protective suits for the civil and military fields, it is suggested that this filter material have a first layer as textile support layer which is bonded to a second layer present in the form of an areal adhesive layer. In addition, the filter material has a third layer applied to the second layer and areally bonded thereto, this third layer comprising a textile sheet-like layer containing activated carbon fibers.

34 Claims, 7 Drawing Sheets

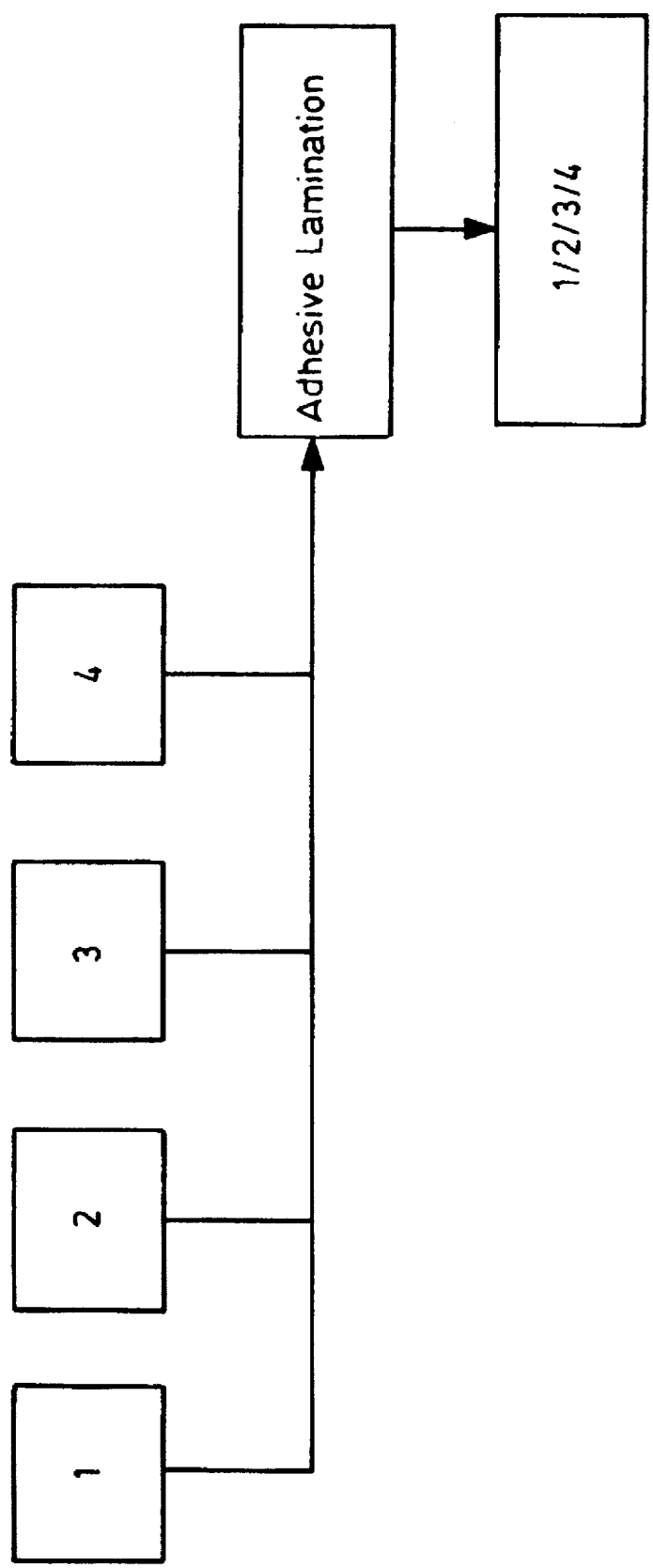

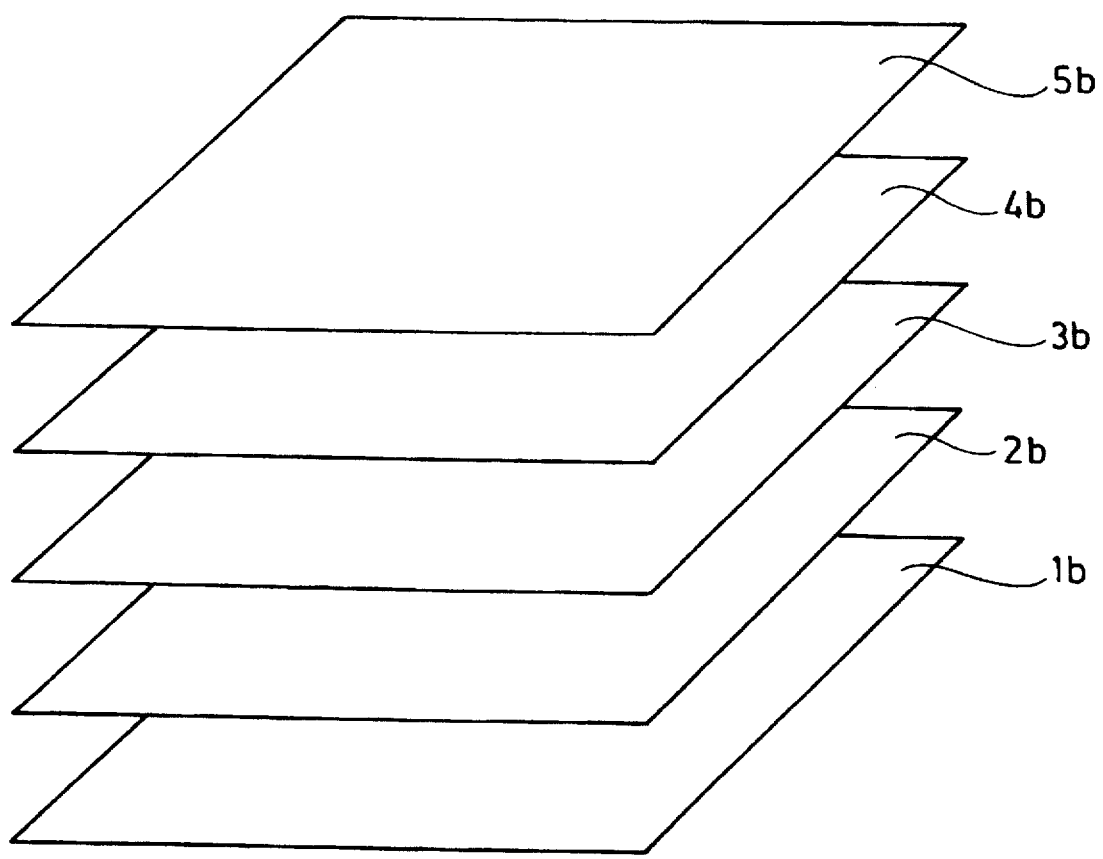

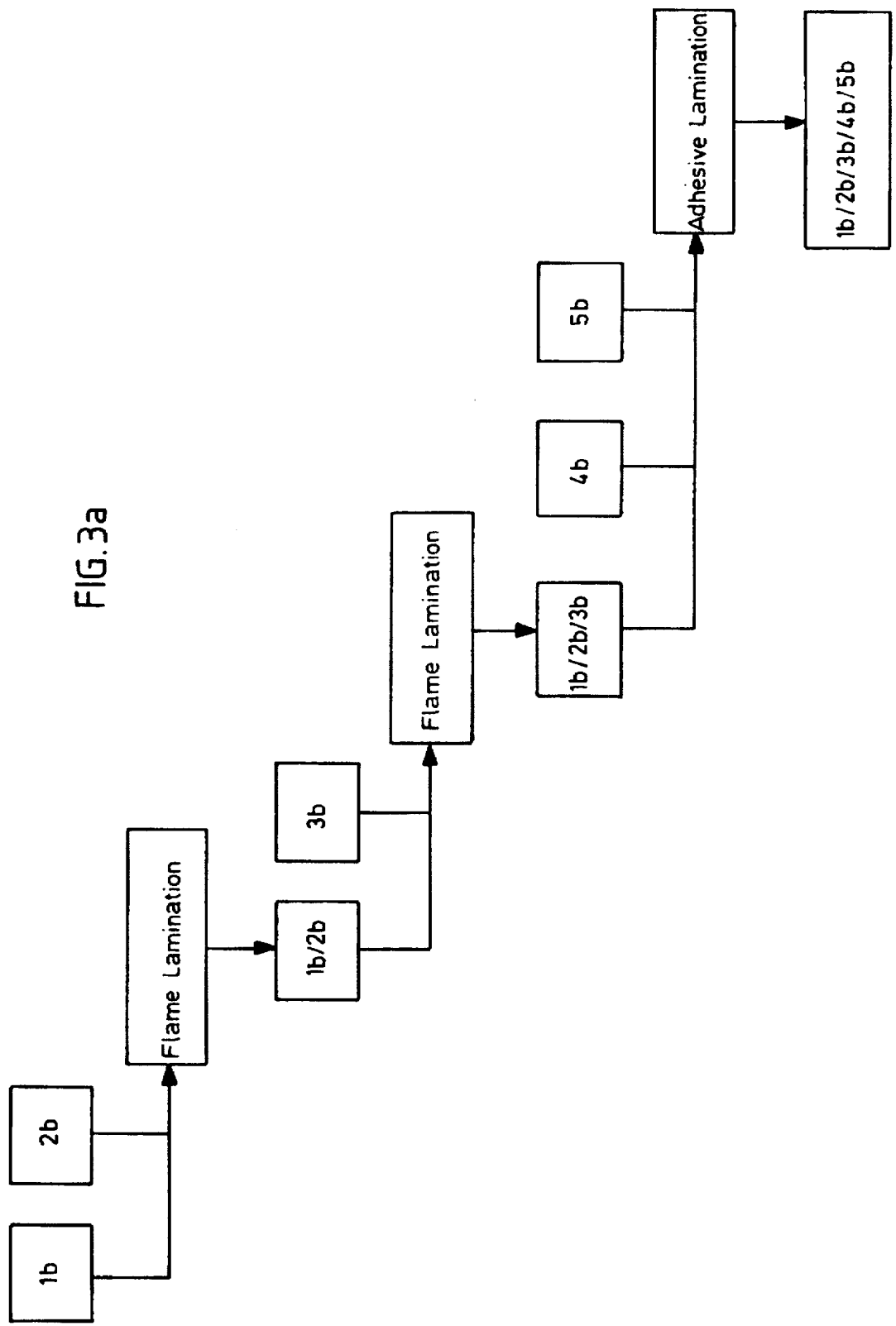

MULTILAYERED, TEXTILE, GAS-PERMEABLE FILTER MATERIAL AGAINST TOXIC CHEMICAL SUBSTANCES

BACKGROUND OF THE INVENTION

The invention relates to a multilayered, textile, gas-permeable filter material against toxic chemical substances and, in particular, filter and protective materials for the production of sheet-like filters and protective suits for the civil and military fields.

Previously known filter materials of the type described at the outset have a textile support material, on which adsorber beads, in particular active carbon beads, are adhered via adhesive screens. These beads are, where applicable, protected from any premature wear and tear by a gas-permeable protective layer (EP-B 0 090 073).

In addition, filter materials are known, in which a woven fabric containing activated carbon fibers is adhered to the textile supports with an adhesive screen. If such fabrics containing activated carbon fibers are laminated between two textile layers, the material obtained according to EP-A-0 230 097 is merely one, in which the fabric containing the activated carbon fibers disintegrates to fine dust already at the slightest tensile strain.

The disadvantage of the state of the art is that there is insufficient bonding of the textile support material with the activated carbon material and, furthermore, the actual adsorption layer which contains the activated carbon can only inadequately withstand mechanical stressing such as that occurring, for example, when protective suits made from the protective material are worn.

The object of the invention is to develop the filter material described in EP-A-230 097, which comprises a first layer as textile support layer, a second layer in the form of an adhesive layer bonded to the first layer and a third layer which is applied to the second layer, is bonded thereto and comprises a textile sheet-like layer containing activated carbon fibers, further such that the disadvantages specified above are avoided.

SUMMARY OF THE INVENTION

This object is accomplished in accordance with the invention, in the filter material described at the outset, in that the second layer is an areal adhesive layer consisting of an adhesive spun fiber yarn, fleece or screen, an adhesive foil, a woven or knitted adhesive fabric or the like or an open-cell foamed material layer laminated to the adjacent layer(s) in the flame laminating process and that the second layer is areally bonded to the first and third layers.

This third layer can be additionally protected by a fourth layer in the form of an areal adhesive layer which is applied to the third layer, opposite the second layer, and areally bonded thereto.

Although extremely thin adhesive layers, in particular in the form of spun yarns, fleeces, foils etc., can be used for the adhesive layers, the fourth layer as adhesive layer is, in particular, sufficient to additionally stabilize the third layer with the textile sheet-like layer containing the activated carbon and to protect it against wear and tear. Surprisingly, the fourth layer offers not only an adequate, mechanical protective effect against wear and tear but also leads, in addition and in cooperation with the second layer in the form of an areal adhesive layer, to a strengthening of the third layer held between the two layers so that this can, for the most part, be selected wholly in view of its protective effect, independently of its inherent mechanical stability, and used in the protective material.

A particularly suitable adhesive layer material is available in the form of slotted adhesive coating foils which act as a type of dry melting adhesive.

The adhesive layer material is preferably produced from a thermoplastic polymer material, reference being made in this respect, in particular, to the plastic materials PVC, polyurethane, polyester and polyamide. It is important in the case of the adhesive layers for them to be adequately gas-permeable, i.e. that the foils have, in particular, a perforation, preferably a microperforation, which is retained during the thermal bonding or the thermal activation of the adhesive layer during processing.

Apart from the adhesive layer materials described in the above, an open-cell foamed material layer which is laminated on is particularly suitable and this, due to its foam structure, takes over not only the function of an adhesive but also, simultaneously, the function of a protective layer against mechanical damage to the textile sheet-like layer containing activated carbon fibers. A flame laminating method is preferably used for the lamination process, whereby the thickness of the layer remaining in the finished product—and therefore the protective effect of the foamed material layer—can be predetermined very exactly. The thickness of the foamed material layer can be selected such that the areal filter material is permanently deformable in a subsequent treatment step using heat and pressure.

Moreover, reticulated foamed materials are suitable as adhesive layer materials; these exercise not only the function of an adhesive but also a filtering function, above all in contact with liquids. A mechanical protective effect is also offered by the reticulated foamed materials.

In the case of protective materials, reticulated foamed material is preferably used on the external side as adhesive layer while open-cell foamed material is preferably used on the inner side, i.e. the side facing the skin.

For the first time it is now suggested to use the flame laminating process during the production of textiles which are used in the production of clothing.

The textile sheet-like layer which contains the activated carbon fibers can, in principle, be manufactured according to different technologies, for example according to the teaching of EP 0 079 488 B1, EP 0 230 097 A2 or also DE 33 25 644 C2.

These technologies deal with woven fabrics which comprise activated carbon staple fibers, whereby the first-named EP 0 079 488 discloses woven fabrics made from a composite yarn of textile staple fibers containing a proportion of active carbon staple fibers which is between 5 and 75% by weight. The proportion of staple fibers which does not consist of active carbon staple fibers is essentially responsible for the stability of the composite yarn or the woven fabric formed therefrom.

Alternatively, a process according to EP 0 230 097 A2 is conceivable, where activated carbon fibers are needled to an additional textile material and thereby form a type of areal felt-like layer.

The third type differing herefrom is formed by DE 33 25 644 C2 where a spun yarn made from activated carbon fibers is used.

The greatest adsorption activity is to be expected from the last-named type of fiber or textile sheet-like layer material, whereby it is, however, to be pointed out at the same time that the mechanical strength of this type of adsorber layer is less in comparison with the other two types.

This textile sheet-like layer with the activated carbon fibers can be provided as woven fabric, felt, knitted fabric, fleece etc. As already specified in the above, it is not necessary due to the inventive structure for the textile sheet-like layer with the activated carbon fibers to have a particular mechanical strength since this is given to it by the adhesive layers covering it areally, where applicable, on both sides.

The three, four or more layers are brought together during production to form a pile and pass as a stacked layer through a heating zone which is preferably formed by heating rollers. In the heating zone, the adhesive of the second and fourth (when present) layers is activated and thus provides for an areal bonding of the pile.

During the flame lamination of the foamed material layers, the textile support layer is first of all laminated with a foamed material layer and, subsequently, the textile sheet-like layer containing activated carbon fibers is laminated onto this double layer in an additional laminating process on the side of the free foamed material layer. Alternatively, the three layers, namely the textile support layer, the foamed material layer and the sheet-like layer, can also be processed together and brought together simultaneously in one method step, whereby the two laminating processes then run at the same time.

Depending on the conditions selected for the flame lamination, the thickness of the foamed material layer can be reduced as required during a lamination process and therefore adapted to the intended use of the finished filter material in many respects, for example with regard to the thermal passage value, air permeability, protective effect against mechanical influences etc.

Finally, in a preferred embodiment, a fifth layer can be provided in the form of a microporous, gas-permeable but liquid-impermeable material as additional protective layer. This can rest essentially loosely on the pile of layers one to four or, however, be areally bonded to the fourth layer.

The textile support layer (first layer) is preferably produced from an air-permeable, tear-resistant and dimensionally stable material. The textile support layer can therefore define the mechanical properties for the filter material as a whole, in particular tensile strength and elongation strength, whereby, in particular, the dimensional stability of the material and a correspondingly smaller value for the elastic elongation of the material ensure that the textile sheet-like layer containing activated carbon fibers which is to be protected is not stretched beyond the allowable degree during use of the filter materials.

In view of these desired properties, the textile support layer preferably has a tensile strength of >300N. With regard to the elastic elongation, it is desirable for the textile support layer to have a value of <12%. The conventional materials available for producing the textile sheet-like layer containing activated carbon fibers easily sustain an elastic elongation of <12%. Thereafter, the elastic extensibility of the textile support layer has a limiting effect for the further elongation and thus prevents any tearing of the textile sheet-like layer containing activated carbon fibers within the filter material.

The textile support layer, the essential task of which is first to lend the filter material a dimensional stability and a certain tensile strength, can be selected with a very low weight per unit area of, for example, 30 g/m$^2$ to 150 g/m$^2$ so that it contributes little to the weight per unit area of the filter material but, on the other hand, fulfills the functions defined above in full.

The gas permeability of the textile support layer, insofar as this is of significance only in its support function for the filter material, should preferably be between 100 to 500 l/(dm$^2$×min).

If the filter material is intended to be used as protective material in protective clothing, there are cases of use where the textile support layer is preferably produced from a woven microfiber fabric which is, indeed, gas-permeable but protects against strain due to wind. In this case, the gas permeability is then essentially less than previously defined, namely approximately 10 to 30 l/(dm$^2$×min). Then, the support layer preferably has, at the same time, the advantage of water impermeability, namely up to a column of water of at least 500 mm, preferably at least 1000 mm. The support layer can, in this case, function simultaneously as upper layer or cover layer.

The woven microfiber fabric prevents liquid penetrating as far as the sheet-like layer containing activated carbon fibers, wetting the activated carbon fibers and thereby reducing the absorptive capacity and filtering effect for harmful gases.

The foamed material layer in the finished filter material preferably has a thickness of up to 0.7 mm, in addition preferably in the range of approximately 0.3 mm to approximately 0.5 mm.

The thermal insulation value of the three-layered filter material is, in particular when the filter material is used as protective material for protective clothing, preferably ≦70× 10$^3$ m$^2$ K/W. The third layer, which is formed from the textile sheet-like layer containing activated carbon fibers, can be provided with a fourth layer in the form of an open-cell foamed material layer as additional layer improving the strengths of the filter material and, in particular, the mechanical serviceability of the sheet-like layer; this fourth layer is then preferably laminated on likewise by flame lamination. A preferable effect in this case is the fact that the second foamed material layer is laminated on together with a second textile layer so that, in the end, a six-layered laminated material is obtained. The duplicated textile layers and foamed material layers can either be the same as one another or different from one another, depending on the purpose for which the filter material is used.

The foamed material layers can, in particular, have a different thickness, depending on whether they come to be located on the inside or the outside, for example, in a protective material for protective clothing.

In a preferred embodiment of the invention, the first and/or the second foamed material layer is heat-deformable and following the heat-forming step forms an essentially self-supporting structure for the filter material. This can be used for the production of, for example, filter materials having a large surface area and a zigzag structure in the sectional view or filter materials having a certain shape can be formed which make the filter material suitable as a complete filter element in filter devices.

In the following, the invention will be explained in greater detail on the basis of the drawings.

BRIEF DESCRIPTION OF THE DRAWINGS

FIG. 1a is a diagram showing the process sequence relating to the filter material of FIG. 1;

FIG. 3 shows a five-layered, inventive filter material; and

FIGS. 3a and 3b are diagrams showing the process sequence relating to the filter material of FIG. 3.

DETAILED DESCRIPTION OF THE INVENTION

Figure 1:
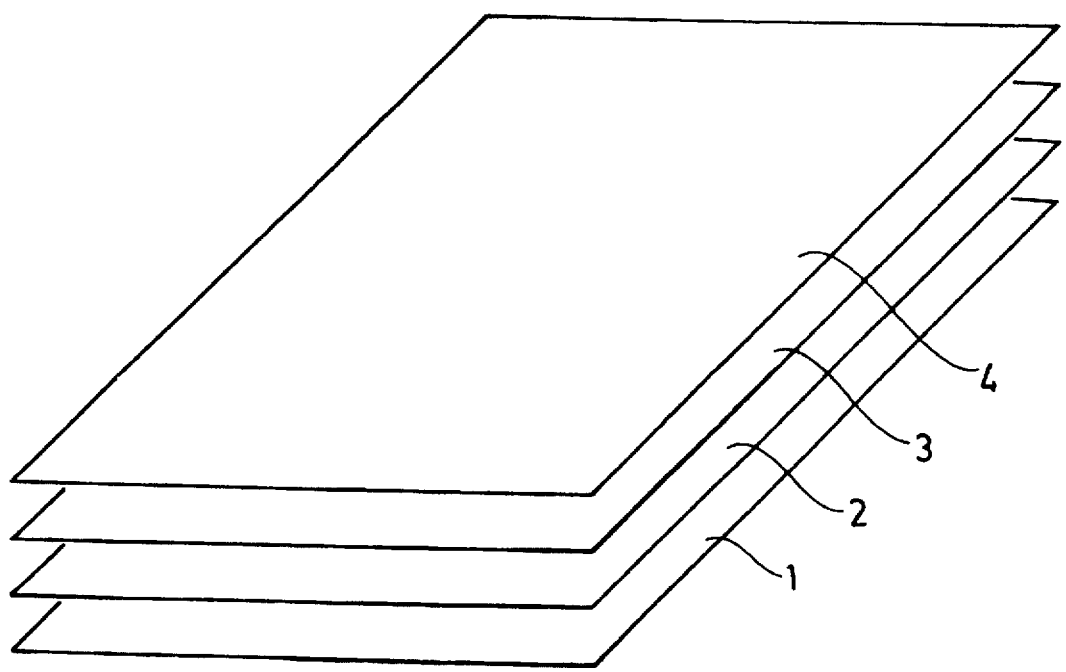
FIG. 1 shows a four-layered, inventive filter material.

FIG. 1 shows an inventive, multilayered, textile filter material which can be used as protective material in protective clothing, whereby a first, textile layer as support layer is designated with the reference numeral 1, a second layer in the form of an areal adhesive layer which is areally bonded to the first layer is designated with the reference numeral 2, a third layer which is applied to the second layer and areally bonded thereto and comprises a textile sheet-like layer containing activated carbon fibers is designated with the reference numeral 3 and a fourth layer which, like the second layer 2, represents an areal adhesive layer which is applied to the third layer opposite the second and is areally bonded thereto is designated with the reference numeral 4.

Preferably, the support layer 1 has a weave structure while the adhesive layers 2 and 4 are either produced from a relatively dense adhesive spun fiber yarn, fleece or woven fabric or the like but are gas-permeable or they are provided in the form of a foil which has a perforation which essentially remains even after the adhesive process. The third layer 3 is formed by an adsorption layer which consists of a woven fabric produced from a spun yarn made from activated carbon fibers, as described in DE 33 25 644 C2.

The fourth layer 4 functioning as a cover layer is again formed by a PU adhesive fleece or adhesive foil and can consist of the same material as the second layer.

Suitable foils are, in particular, also those foils which have punctiform material concentrations in a regular distribution.

The support layer 1, predominantly a woven, weft-knit or knitted fabric, having a weight per unit area of 50 to 1000 g/m², preferably 100 to 400 g/m², is intended to have an air permeability of 10 to 1000 l/min×100 cm², mainly, however, of 100 to 400 l/min×100 cm², measured at 1 mbar underpressure.

The adsorption layer 3 can either be produced from spun yarns which can consist of activated carbon fibers or of filament yarns which can, again, consist of activated carbons, or the adsorption layer 3 is activated in a second operational step in a water vapor atmosphere at 800° C.

The adsorption layer 3 can equally be formed from spun fiber yarn consisting of carbonaceous materials, in particular on the basis of preoxidized polyacrylonitrile, either to 100% or in a mixture with another spun fiber of comparable length. The composite yarn resulting therefrom consists to 10 to 90% by weight of carbonaceous fiber material, mainly 30 to 70% by weight, and for the rest of textile spun fibers, in particular of natural fibers or chemical fibers, which can again consist of natural polymers on an organic or inorganic basis or of synthetic materials, in particular cotton, wool, silk, polyamide, polyester, polyacryl, aramide or viscose fibers. From a statistical point of view, the spun fibers are present in the yarn core in an even distribution. Either flame-retardant substances can be added to these fibers or they can be impregnated in a flame-retardant manner in an additional finishing process. These fibers preferably have a fineness in the range of 0.4 to 7 dtex, mainly 0.8 to 2 dtex, and a staple length of 10 to 100 mm, mainly of 30 to 60 mm. These fibers can be either smooth or crimped.

Either the fiber is activated or the yarn or a finished textile fabric. The specific surface area of the adsorption layer 3 should be from 100 to 2000 m²/g, preferably 800 to 1200 m²/g.

The yarns spun from these materials can be produced either according to classic spinning methods, such as, for example, the ring spinning method, or according to newer spinning methods, such as open-end rotor spinning, open-end friction spinning, twist spinning, rubbing (self-twist), respooling method, false-twist method, bonding/heat-sealing or felting.

FIG. 1a shows on the basis of a block diagram a preferred process sequence for producing the filter material shown in FIG. 1. In this respect, the individual four layers 1, 2, 3 and 4 are first brought together and fed to the device for adhesive lamination as a four-layered pile. The result is the multilayered, stacked material 1/2/3/4 areally bonded together.

Figure 2:
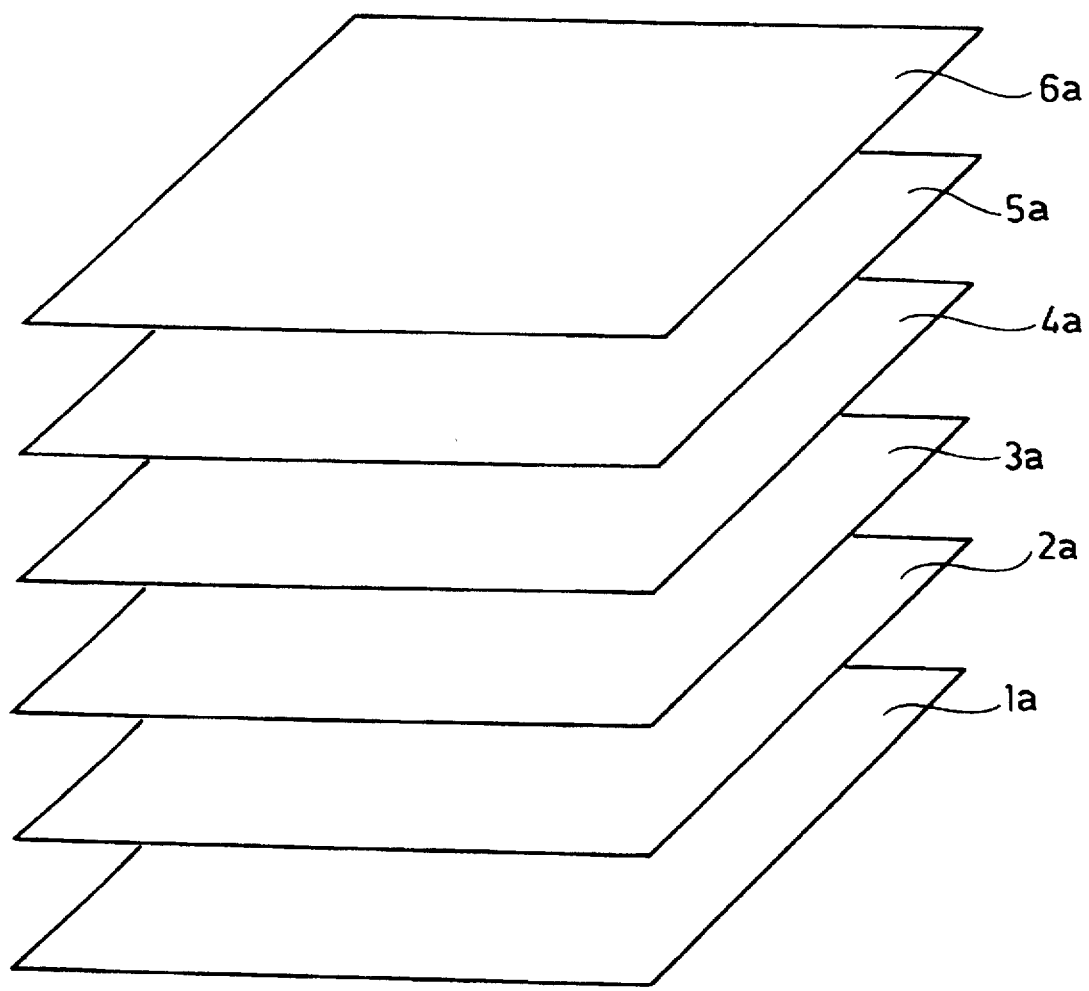
FIG. 2 shows a six-layered, inventive filter material.

FIGS. 2 and 3 show filter materials which comprise a combination of three layers as a basic structure, namely a support or cover layer, a soft foam layer and a sheet-like layer containing active carbon fibers. This basic structure is varied in FIGS. 2 and 3 for two different applications, as will be described in the following.

FIG. 2 illustrates a six-layered structure of a filter material which comprises a support layer 1a which can be produced, for example, from a knitted polyester material (warp knit fabric) and in the present case has a weight per unit area of approximately 40 g/m². This is followed by a membrane 2a as second layer on the basis of hydrophilic polyurethane which is applied to the support layer 1a by means of reverse coating with a weight per unit area of approximately 40 g/m². Impraperm of the company Bayer AG is preferably used for this. This membrane 2a is liquid-tight up to and above 700 mm of water column.

A foamed material layer 3a is applied as third layer in the flame laminating process and this can be formed from polyurethane, a soft polyurethane ether foam or a soft polyurethane ester foam. In this case, a material having a bulk density of 42 kg/m³ is preferably used. The compression hardness of this material is 4.9 kPa, the number of cells per cm 17±3. The thickness of the starting material is, in this example, 1.6 mm, the thickness in the finished product 0.3 mm. The third layer is preferably finished in a flame-retardant manner.

A sheet-like layer 4a consisting of a completely carbonized and activated woven viscose fabric is used as fourth layer, in this example with a weight per unit area of 120 g/², a thickness of 0.45 mm and a specific inner surface area of 1000 to 1200 m²/g.

An adhesive layer 5a in the form of a hydrophilic adhesive coating (polyurethane basis) is laminated as fifth layer to the sheet-like layer 4a, namely with a weight per unit area of approximately 8 g/m². A woven face fabric is applied as last layer in the form of a cover layer 6a and this can, of course, also be replaced by a weft-knit or knitted textile layer. In the present example, a twill cloth is used (65% viscose, 35% Nomex) with a weight per unit area of approximately 260 g/m².

By incorporating a suitable membrane in the structure of the filter material, the protective properties of a protective clothing system made from the material as described can be considerably improved in relation to toxic chemical substances whilst ensuring an adequate water vapor permeability and so it is also possible to use such systems for purposes which could not be covered with permeable protective clothing systems previously known and which had therefore to be accomplished solely with insulating (e.g. rubberized) protective suits. Due to the water vapor permeability of the membrane, the physiological wearing properties can be noticeably improved in comparison with insulating protective clothing systems and therefore longer wearing times can be achieved. By using the material structure as described, such protective clothing systems can, for example, be used, in particular, for ABC defence personnel (of detection, decontamination units, etc.) in the armed forces and in civil defence as well as for combat clothing for ship's crews in the naval forces (battle dress sea with integrated ABC protection).

The flame laminating process which is used according to the present invention for the first time in the production of protective materials for the production of clothing is of particular significance for the lamination of the foamed material layers. The use of foamed material layers as adhesive layers is preferred on account of the advantages described in the above, which are particularly effective in conjunction with the flame laminating process.

Figure 2A:
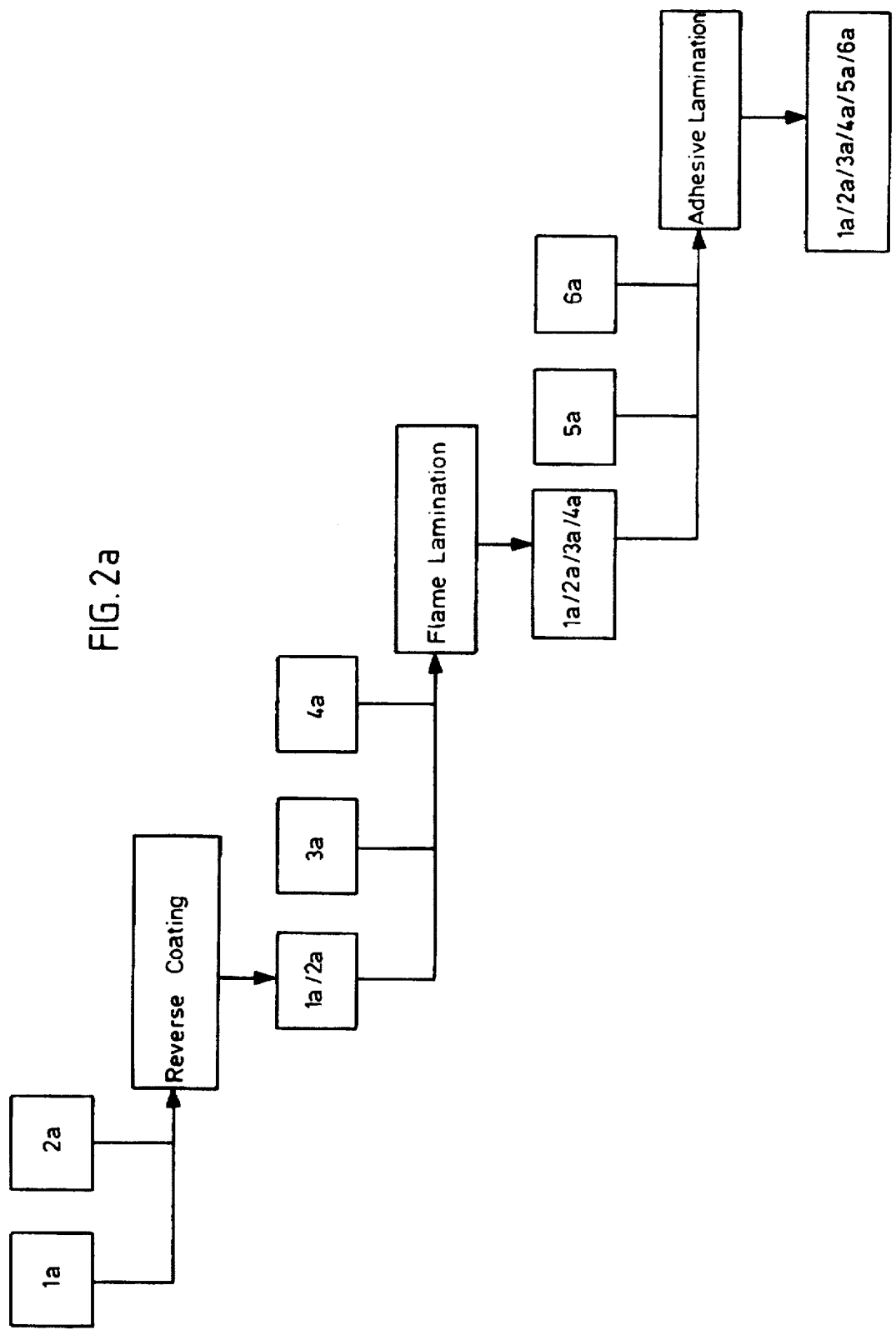
FIG. 2a is a diagram showing the process sequence relating to the filter material of FIG. 2.

FIG. 2a shows a preferred production process for the product shown in FIG. 2 in the form of a block diagram.

First of all, a membrane 2a made of hydrophilic polyurethane is applied to the support layer 1a with a reverse coating process.

This modified support layer 1a/2a is brought together with the foamed material layer 3a and the sheet-like layer 4a made of carbonized woven viscose fabric in a process step and they are bonded to one another in a common flame lamination step. The multilayered material 1a/2a/3a/4a thus obtained is provided with a hydrophilic adhesive coating 5a and brought together with the cover layer 6a and areally bonded in an adhesive lamination step to form the product 1a/2a/3a/4a/5a/6a.

FIG. 3 shows a different type of structure, in which a soft polyurethane foam layer 2b (on the basis of polyurethane ethers or polyurethane esters) is applied to a support layer 1b which can be a woven, knitted, weft-knit fabric etc. A sheet-like layer 3b which contains active carbon fibers is applied to this double layer. A PU soft foam layer 4b can, again, be laminated to this three-layered material and following this foam layer a cover layer 5b, or the layers 4b and 5b are already bonded to one another beforehand in a laminating process and then laminated to the threefold layer consisting of the layers 1b, 2b and 3b as a double layer.

The material structure thus created ensures the required high protective capacity of the protective clothing system with respect to toxic chemical substances with, at the same time, additional, considerable improvement in the microclimate underneath the protective suit. On account of the considerably more favorable physiological wearing properties which are thus achieved the material is suitable, in particular, for protective clothing systems which can be used as required, as protective suits to be worn over normal uniforms ("overgarment"), as army combat suits with integrated ABC protection for climatically hot regions or as protective clothing in civil defence and protection of the civilian population or the like.

Due to the possibilities for varying the individual material layers, both universally usable protective clothing systems as well as clothing systems complying with specific customer requirements can be covered within the scope of the material structure described.

Figure 3B:
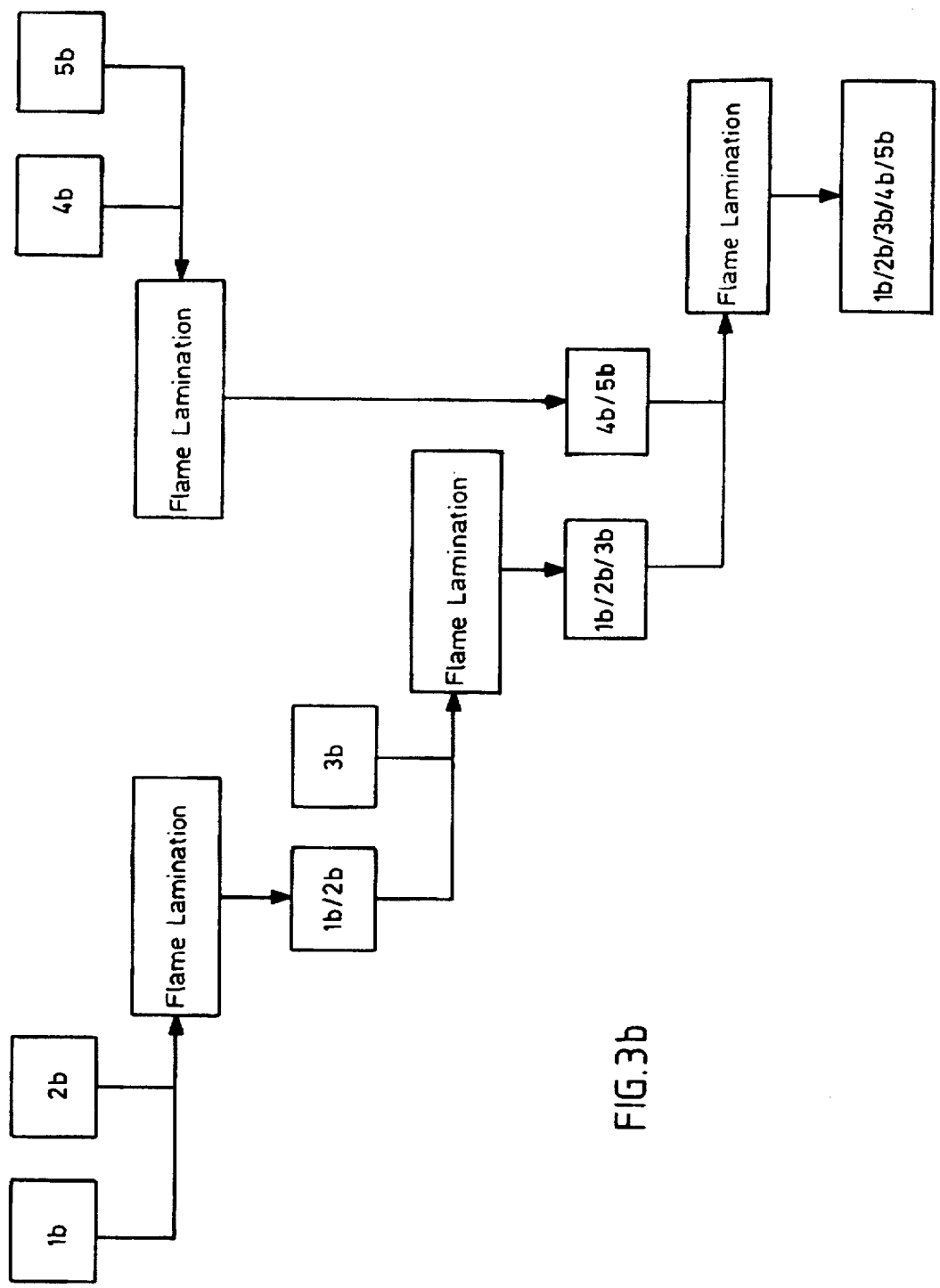

The processes described in the above are shown in a summarized manner in the form of block diagrams in FIGS. 3a and 3b.

According to the process shown in FIG. 3a, the support layer 1b consisting of a linen fabric (65% viscose, 35% Nomex) and having a weight per unit area of approximately 150 g/m² is first of all areally bonded to the open-cell foamed material laminating layer 2b (polyurethane ether type) having a bulk density of 42 kg/m³, a compression hardness of 4.9 kPa, 17±3 cells per cm, a material thickness of 1.6 mm and a thickness in the finished product of 0.3 mm in a flame lamination step.

The flame-laminated support layer 1b/2b is brought together in the following step with the sheet-like layer 3b (100% activated carbon fibers) having a weight per unit area of approximately 120 g/m², a thickness of 0.45 mm and an inner specific surface area of 1000–1200 m² and flame laminated.

The threefold layer 1b/2b/3b is given on the side of the sheet-like layer 3b an adhesive coating 4b consisting of hydrophilic polyurethane having a weight per unit area of approximately 8 g/m² and is then brought together with the cover layer 5b. The cover layer preferably consists of non-woven material (Sontara spun fleece) made from Nomex/Kevlar having a weight per unit area of approximately 31 g/m². These superimposed layers are areally bonded to one another in a final adhesive lamination step to form the end product 1b/2b/3b/4b/5b.

Alternatively, the layers 4b and 5b can be brought together according to the process sequence shown in FIG. 3b and bonded in a flame lamination step. The material of the layer 4b is in this case a flame-laminatable foamed material, such as that already used for the layer 2b. Subsequently, the threefold layer 1b/2b/3b (cf. FIG. 3a) is bonded to the double layer 4b/5b in a fourth flame lamination step to form the product 1b/2b/3b/4b/5b.

What is claimed is:

1. A multilayered, textile, gas-permeable material for filtering against toxic chemical substances, comprising:
   a first layer as a textile support layer;
   a second layer in the form of an adhesive layer bonded to said first layer;
   a third layer applied to said second layer and bonded thereto, said third layer comprising a textile sheet-like layer containing activated carbon fibers; and a fourth layer serving as a protective layer for said third layer in the form of an adhesive layer, arranged opposite the second layer and unilaterally bonded to the third layer wherein the second layer is an areal adhesive layer, said second layer being areally bonded to the first and third layers.

2. A filter material as defined in claim 1, wherein the second and the fourth layer is selected from the group consisting of at least one of an adhesive spun fiber yarn, fleece or screen, an adhesive foil, a woven or knitted adhesive fabric or an open-cell foamed material layer laminated to the adjacent layer(s) by a flame laminating process.

3. A filter material as defined in claim 2, wherein the adhesive layer material is a thermoplastic polymer material selected from the group consisting of at least one of polyurethane, polyvinyl chloride, polyamide and polyester.

4. A filter material as defined in claim 1, wherein the second and fourth layers are open-cell foamed material layers laminated to the adjacent layer by a flame laminating process.

5. A filter material as defined in claim 1, wherein the textile sheet-like layer comprises the activated carbon fibers in a mixture with staple fibers processed to form a composite yarn.

6. A filter material as defined in claim 1, wherein the textile sheet-like layer essentially consists exclusively of activated carbon fibers.

7. A filter material as defined in claim 1, wherein the textile sheet-like layer is selected from the group consisting of a woven, a felt, a weft-knit, a knitted and a fleece structure.

8. A filter material as defined in claim 1, further comprising a fifth layer in the form of a microporous, gas-permeable but liquid-impermeable material adjacent to the fourth layer.

9. A filter material as defined in claim 1, further comprising a fifth layer in the form of a membrane based on a hydrophilic polyurethane polymer, said fifth layer being arranged adjacent to the fourth layer.

10. A filter material as defined in claim 1, wherein the textile support layer is produced from an air-permeable, tear-resistant and dimensionally stable material.

11. A filter material as defined in claim 10, wherein the textile support layer has a tensile strength of >300N.

12. A filter material as defined in claim 10, wherein the textile support layer has an elastic elongation of <12%.

13. A filter material as defined in claim 10, wherein the textile support layer has a weight per unit area of approximately 30 g/m$^2$ to 150 g/m$^2$.

14. A filter material as defined in claim 10, wherein the gas permeability of the textile support layer is within a range from about 100 to 500 1/(dm$^2$×min).

15. A filter material as defined in claim 1, wherein the textile support layer is a woven microfiber fabric.

16. A filter material as defined in claim 15, wherein the gas permeability of the textile support layer is approximately 10 to 30 1/(dm$^2$×min) and the support layer is watertight up to a column of water of at least approximately 500 mm.

17. A filter material as defined in claim 4, wherein the foamed material layer in the finished filter material has a thickness of approximately 0.3 mm to approximately 0.5 mm.

18. A filter material as defined in claim 1, wherein the thermal insulation value of the first, second and third layers of the filter material is together $\leq 70 \times 10^3$ m$^2$ K/W.

19. A filter material as defined in claim 4, wherein said fourth layer is laminated to the third layer in the form of a second open-cell foamed material layer.

20. A filter material as defined in claim 19, wherein the second foamed material layer is laminated together with a second textile layer.

21. A filter material as defined in claim 19, wherein at least one of the first and the second foamed material layers is heat-deformable and forms a self-supporting structure of the filter material.

22. A filter for the supply of fresh air in motor vehicles constructed from the filter material of claim 1.

23. A protective suit, constructed from the filter material of claim 1.

24. A filter element for ventilation systems of motor vehicles, produced with the use of the filter material of claim 1.

25. A filter element as defined in claim 24, wherein the filter material is formed in a thermoforming step.

26. A filter element as defined in claim 25, wherein the filter material is designed as a self-supporting component.

27. A filter element as defined in claim 26, wherein the filter material is designed with one of a rib or corrugated structure for improving its inherent stability.

28. Shoe insoles, produced from a filter material as defined in claim 1.

29. A filter material as defined in claim 1, wherein said second layer is applied over substantially the entire first layer.

30. A filter material as defined in claim 1, wherein said third layer is applied over substantially the entire second layer.

31. A filter material as defined in claim 1, wherein said fourth layer is applied over substantially the entire third layer.

32. A filter material as defined in claim 1, wherein said fourth layer is an outer layer of said material.

33. A filter material as defined in claim 9, wherein said fifth layer passes water vapor at a rate of approximately 200 g/(m$^2$×24 h).

34. A filter material as defined in claim 16, wherein said support layer is watertight up to a column of water of at least approximately 1,000 mm.

* * * * *